United States Patent [19]

Iji et al.

[11] Patent Number: 4,720,515

[45] Date of Patent: Jan. 19, 1988

[54] EPOXY RESIN COMPOSITION FOR ENCAPSULATING SEMICONDUCTOR

[75] Inventors: Masatoshi Iji, Fuchu; Masayuki Kobayashi, Isehara; Shinichiro Asai, Machida, all of Japan

[73] Assignee: Denki Kagaku Kogyo Kabushiki Kaisha, Tokyo, Japan

[21] Appl. No.: 863,882

[22] Filed: May 16, 1986

[30] Foreign Application Priority Data

May 17, 1985 [JP] Japan .................... 60-103691
Nov. 26, 1985 [JP] Japan .................... 60-263914

[51] Int. Cl.$^4$ .................... C08L 83/00; C08L 63/00
[52] U.S. Cl. .................... 523/435; 523/400; 525/476
[58] Field of Search .................... 523/400, 427, 435; 525/476

[56] References Cited

U.S. PATENT DOCUMENTS 4,291,144 9/1981 Takago .................... 525/476

FOREIGN PATENT DOCUMENTS 56-160055 12/1981 Japan .................... 523/435

Primary Examiner—Lewis T. Jacobs
Attorney, Agent, or Firm—Keil & Weinkauf

[57] ABSTRACT

An epoxy resin composition is provided for encapsulating a semiconductor. The resin composition contains an epoxy resin, a phenol resin, a phenol-modified silicon-containing compound and an inorganic filler. The phenol-modified silicon-containing compound is obtained by reacting a first and/or second organic silicone compound (formulae (1-a), (1-b) and (2)) with an organic silicon compound (formula (3)) and with a phenol resin:

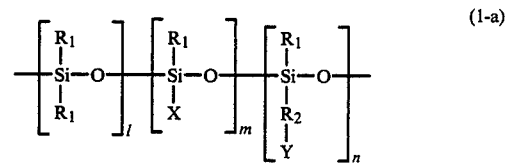

(1-a)

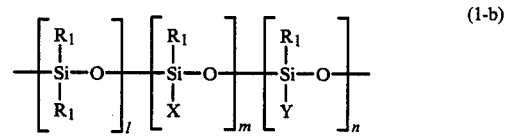

(1-b)

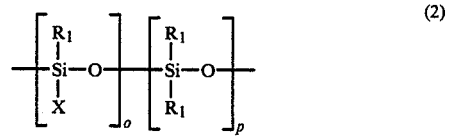

(2)

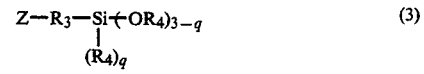

(3)

wherein X stands for an organic group containing an epoxy group, Y for a polyoxyalkylene group and Z for a mercapto group, an amino group or a ureido group.

15 Claims, No Drawings

EPOXY RESIN COMPOSITION FOR ENCAPSULATING SEMICONDUCTOR

BACKGROUND OF THE INVENTION

1. Field of the Invention

The present invention relates to an epoxy resin composition for encapsulating a semiconductor, and more particularly to an epoxy resin composition containing a phenol-modified silicon-containing compound used for such a purpose.

2. Related Art Statement

In recent years, semiconductors are predominantly encapsulated with resins, and epoxy resin compositions are commonly used for such purpose in consideration of excellent adhesiveness and relatively low cost of the epoxy resin compositions. However, further technical improvements are required for maintenance of the encapsulated semiconductor. One of the important tasks is the improvement of reliability against humidity and another important task is the reduction in internal stress caused by shrinkage upon curing and by differnce in thermal expansion coefficients of the resin and the semiconductor elements.

Particularly for the encapsulation of a large integrated circuit including a large size elements, cracking of the resin due to internal stress or stress caused by thermal shock poses a serious problem.

In order to solve such a problem, various investigations have been made with the aim at reducing the internal stress of the resin by decreasing the thermal coefficient of the resin composition to bring the same closer to the thermal expansion coefficient of the elements of the integrated circuit or by lowering the modulus of elasticity of the resin composition.

In general, the thermal expansion coefficient may be decreased by adding an inorganic filler having a small thermal expansion coefficient in the resin composition. However, since the modulus of elasticity is increased by the addition of an inorganic filler, the reduction of the internal stress is not sufficient. Moreover, if a large amount of an inorganic filler is added to the resin composition, problems arise due to poor moldability and low fluidity. The modulus of elasticity is lowered by the addition of an elastic additive to the resin composition. The elastic additives used for this purpose are rubbers (as disclosed by Japanese Patent Laid-Open Publication No. 131223/1982) and elastic silicone compounds. Silicone compounds are expected to be well suited for such purpose since they are superior over conventional rubbers in resistance to heat and contain only little impurities. Conventional techniques for the inclusion of silicone compounds include the addition of a silicone compound which is not reactable with the resin as disclosed by Japanese Patent Laid-Open Publication No. 219218/1983, and the addition of a silicone compound having a functional group reactable with the resin as taught by Japanese Patent Laid-Open Publication Nos. 145942/1981 and 138730/1983. However, the internal stress of the resin composition could not be lowered to a satisfactory level by the techniques taught by the preceding trials. A silicone compound which is not reactable with the epoxy resin compound is only weakly bound with the epoxy resin at the interfaces therebetween, and such a silicone compound and the epoxy resin are poor in mutual miscibility so that the silicone compound is not dispersed homogeneously in the resin, leading to unsatisfactory results. On the other hand, a silicone compound having a functional group reactable with the epoxy resin is also poor in mutual miscibility with the resin, leading to unsatisfactory reduction in internal stress of the final resin composition.

OBJECTS AND SUMMMARY OF THE INVENTION

A principal object of this invention is to provide an epoxy resin composition for encapsulating a semiconductor, which is considerably reduced in internal stress, improved in resistance to thermal shock, and scarcely damaged by occurrence of cracking.

Another object of this invention is to provide an epoxy resin composition for encapsulating a semiconductor, which is high in reliability against humidity, has a good molding properties and is free from lowering in strength.

The above and other objects of this invention will become apparent from the following description of the invention.

According to the invention, there is provided an epoxy resin composition for encapsulating a semiconductor comprising:

(a) an epoxy resin;
(b) a phenol resin;
(c) a phenol-modified silicon-containing compound obtained by reacting an organic silicone compound selected from the group consisting of a first organic silicone compound selected from and represented by the following formulae (1-a) and (1-b), a second organic silicone compound represented by the following general formula (2), and mixtures of said first and second organic silicone compounds, with an organic silicon compound represented by the following general formula (3) and with a phenol resin;

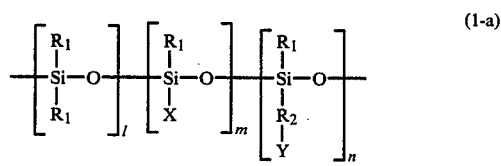

(1-a)

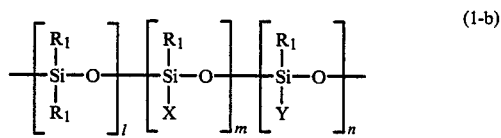

(1-b)

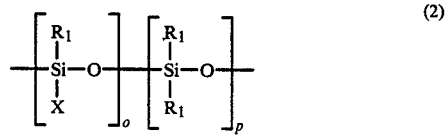

(2)

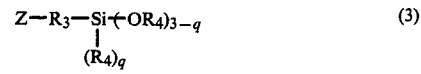

(3)

wherein in the formulae (1a) and (1-b) and (2) $R_1$ stands for a hydrogen atom, a methyl group, an ethyl group or a phenyl group, $R_2$ for an alkylene group having 1 to 5 carbon atoms, X for an organic group containing an epoxy group, Y is a polyoxyalkylene group having a repeating unit and stands for a polyoxyethylene group, a polyoxypropylene group and a copolymer group thereof, and l, m, n, o and p each represents an integer;

and wherein in the formula (3) Z is a functional group reactable with an epoxy group and stands for a mercapto group, an amino group or a ureido group, $R_3$ for an alkylene group having 2 to 5 carbon atoms, $R_4$ for a methyl group or an ethyl group and q is 0, 1 or 2; and (d) an inorganic filler.

DESCRIPTION OF THE INVENTION

The present invention will be described in detail hereinafter.

The epoxy resin (a), which is used in the invention, has preferably at least two epoxy bonds in one molecule, and the molecular structure and molecular weight thereof are not particularly critical in the present invention. For example, a bisphenol-A type epoxy resin, a phenol novolak epoxy resin and a cresol novolak epoxy resin may be preferably used in the invention, and it is desirous that the contents of impurities and chlorine causing hydrolysis reaction in the epoxy resin (a) are as small as possible.

The phenol resin (b) which acts as a curing agent includes a phenol novolak resin and a cresol novolak resin. The amount of the phenol resin (b) contained in the resin composition is not critical, and it is preferable that the stoichiometric amount of the phenol resin or curing agent (b) is added to the epoxy resin.

The organic silicone compounds used for the preparation of the phenol-modified silicon-containing compound (c) include a first organic silicone compound (1-a) and (1-b) and a second organic silicone compound (2) represented, respectively, by the following formulae of:

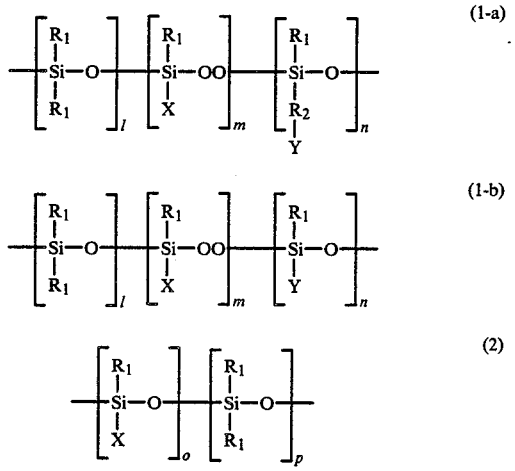

In the formulae (1-a) and (1-b) and (2) set forth above, $R_1$ stands for a hydrogen atom, a methyl group, an ethyl group or a phenyl group, and X stands for an organic group containing an epoxy group, the examples of the latter being

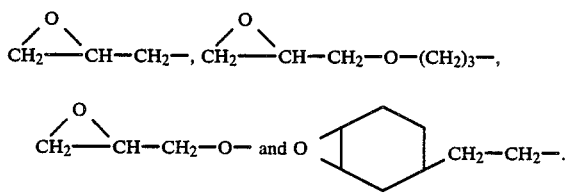

It is essential that the organic silicone compound contains at least one epoxy group, per molecule. In the formulae (1-a) and (1-b) and (2), each of l, m, n, o and p is an integer.

In the formulae (1-a) and (1-b) and (2), $R_2$ stands for an alkylene group having 1 to 5 carbon atoms, and Y is a polyoxyalkylene group having a repeating unit and stands for a polyoxyethylene group, a polyoxypropylene group and a copolymer group thereof. The group Y may be directly bound with a silicon atom, or may be bound indirectly with a silicon atom through the group $R_2$.

The polymerization degree of the polyoxyalkylene group ranges generally from 5 to 500, preferably from 10 to 300. If the polyoxyalkylene group has a polymerization degree of less than 5, it has insufficient miscibility with the epoxy resin. On the contrary, if the polyoxyalkylene group having a polymerization degree of more than 500 is used, the strength of the final epoxy resin composition is reduced, and the reliability against humidity is adversely affected.

Each of the first and second organic silicone compounds, represented respectively by the formulae (1-a) and (1-b) and (2), may preferably have an epoxy equivalent of from 500 to 20,000. If either one of these organic silicone compounds has an epoxy equivalent of less than 500, gelation takes place in the preliminary reaction with a phenol resin to raise a problem. If either one of these organic silicone compounds has an epoxy equivalent of more than 20,000, the adhesiveness thereof with the epoxy resin at the interfaces therebetween is lowered to result in reduction in resistance to thermal shock of the final resin composition. It is preferred that each of the first and second organic silicone compounds has a molecular weight of from 2,000 to 200,000. If the molecular weight of each of the first and second organic silicone compounds is less than 2,000, the aimed improvements of reducing the internal stress and of improving the resistance to thermal shock cannot be attained. On the contrary, if the molecular weight of each of the first and second organic silicone compounds is more than 200,000, the strength of the final resin composition is lowered so far.

The terminal groups of the first and second organic silicone compounds represented by the formulae (1-a) and (1-b) and (2) are not critical, but it is preferred that they are those represented by —OR, —R, —OSi(R)₃ and —Si(R)₃, wherein R is a hydrogen atom, an alkyl group such as methyl and ethyl groups, an aryl group such as a phenyl group, an organic group containing an epoxy group or an organic group containing a vinyl group.

The first and second organic silicone compounds represented by the formulae (1-a) and (1-b) and (2) may be used in combination in any mixing ratio, as far as the content of the polyoxyalkylene group in the resin composition is within the defined range.

It is desirous that the total amount of the first and/or second organic silicone compounds is less than 50 wt % of the resinous ingredients in the composition, since the strength and the reliability against humidity are lowered if the total amount of the first and/or second organic silicone compounds exceeds 50 wt %.

The organic silicon compound used in the preparation of the phenol-modified silicon-containing compound (c) in the present invention is represented by the following general formula (3) of:

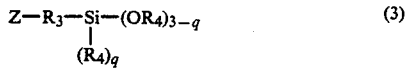

$$Z-R_3-\underset{(R_4)_q}{Si}-(OR_4)_{3-q} \quad (3)$$

wherein Z is a functional group reactable with an epoxy group and stands for a mercapto group, an amino group or a ureido group, $R_3$ stands for an alkylene group having 2 to 5 carbon atoms, $R_4$ stands for a methyl group or an ethyl group and q is 0, 1 or 2.

In preparation of the phenol-modified silicon-containing compound (c), the amount of the organic silicon compound represented by the formula (3) added to the first and/or second organic silicone compounds represented by the formulae (1-a) and (1-b) and (2) is not critical, if based on the stoichiometric amounts of epoxy groups contained in the first and second organic silicone compounds. However, it is preferred that 0.2 to 10 molar equivalents, more preferably 0.5 to 5 molar equivalents, of the organic silicon compound is added per molar equivalent of the epoxy group contained in the first and/or second organic silicone compounds. If the added amount of the organic silicon compound (3) is less than the aforementioned range, the resistance to bleeding of the phenol-modified silicon-containing compound (c) is not appreciable enough for the improvement of the molding properties, and the effects of reducing the internal stress and of improving the resistance to thermal shock are lessened. On the contrary, if the added amount of the organic silicon compound (3) is more than the aforementioned range, the reliability against humidity is lowered or a large amount of burrs is formed at the molding step.

Examples of the phenol resin, which is used in the step of preparing the phenol-modified silicon-containing compound (c) are phenol novolak resins and cresol novolak resins. The amount of such a phenol resin is not critical, but it is desirous to use such a phenol resin in the stoichiometric amount to the epoxy group.

The phenol-modified silicon-containing compound (c) may be prepared in a solvent-containing reaction system or in a solventless reaction system. When the compound (3) is prepared in a solvent-containing reaction system, the first and/or second organic silicone compounds represented by the formulae (1-a) and (1-b) and (2 ) and the organic silicon compound (3) may be dissolved in a solvent therefor, such as methyl ethyl ketone or methyl isobutyl ketone, optionally added with a catalyst such as triphenyl phosphine, and heated under agitation at a temperature of the refluxing temperature of the used solvent for a predetermined time, followed by removal of the solvent by distillation. In cases where the compound (c) is prepared in a solventless reaction system, the phenol resin is melted at a temperature of from 120 to 160° C., optionally added with a catalyst such as triphenyl phosphine, and then added with the first and/or second organic silicone compounds and the organic silicon compound, followed by reacting for a predetermined time under agitation. It is preferable that 50 wt % or more of the epoxy groups contained in the first and/or second organic silicone compounds may be reacted with the phenol resin and the organic silicon compound in order to improve the resistance to thermal shock, the reduction in internal stress and the improvement in resistance to bleeding on the molded article or onto the mold.

The thus prepared phenol-modified silicon-containing compound (c) can be dispersed homogeneously in the matrix epoxy resin (a) and is miscible therewith at the interfaces therebetween, and adheres firmly to the resin (a) due to chemical bonds formed therebetween. The tendency of bleeding of the resin composition to the surface of the molded article or onto the mold is thus diminished by the inclusion of the phenol-modified silicon-containing resin (c).

It is desirous that the phenol-modified silicon-containing compound (c) is added in an amount of from 5 to 50 parts by weight, preferably from 7 to 40 parts by weight, based on 100 parts by weight of the epoxy resin (a). If the added amount of the compound (c) is less than 5 parts by weight, effects of reducing the internal stress and of improving the reliability against humidity are not satisfactory, whereas the strength and the molding properties of the final resin composition are adversely affected if the added amount of the compound (c) is more than 50 parts by weight, based on 100 parts by weight of the epoxy resin (a).

Examples of the inorganic filler used in the invention include powders of crystalline silica, fused silica, calcium silicate, alumina, calcium carbonate, talc and barium sulfate, and fiber glass. The most commonly used inorganic fillers are crystalline silica and fused silica. In order to improve the fluidity of the final resin composition and to prevent the mold from abrasion, spherical silica particles may be preferably used. A low alpha-ray silica may be used for the encapsulation of a memory in order to prevent the occurrence of errors in the stored software. The amount of the inorganic filler (d) contained in the fianl resin composition of the invention ranges preferably from 150 to 900 parts by weight, more preferably from 200 to 700 parts by weight, based on 100 parts by weight of the resinous ingredients (including the epoxy resin (a), the phenol resin (b) acting as a curing agent, the phenol-modified silicon-containing compound (c) and optionally with other resinous additives). If the amount of the inorganic filler (d) is less than 150 parts by weight, the reduction in internal stress, particularly the resistance to thermal shock, does not reach a satisfactory level. It is not desirous that the amount of the inorganic filler is more than 900 parts by weight, because of the fact that the fluidity of the molten resin composition is lowered.

In order to prepare a resin composition which is improved in fluidity and resistance to thermal shock and which is reduced in formation of burrs and internal stress, it is preferred that the inorganic filler (d) comprises 5 to 100 wt % of a first filler (I) having substantially no fractured faces and 95 to 0 wt % of a second filler (II) having substantially fractured faces.

The inorganic filler (I) may have a spherical, oval, gourd-like, tubular and bar-like shape, at least one of the spherical, oval and gourd-like shapes being preferred. These inorganic fillers may be prepared by pulverizing a lump of a material, such as crystalline silica, fused silica, alumina, calcium silicate, talc or calcium carbonate, in a ball mill or a vibrating mill to obtain powders thereof which are blown into a flame or plasma maintained at a temperature for melting the surfaces or entire particles, and the melted particles are then cooled. Otherwise, silica particles may be prepared by hydrolyzing or oxidizing a silane compound represented by $SiH_nCl_{4-n}$ (n is an integer of from 0 to 4) at a high temperature, and the thus synthesized fine silica particles are granulated by spray granulation, followed by baking or fusing.

Examples of the inorganic filler (II) includes powders having substantially fractured faces and made of a material, such as crystalline silica, fused silica, talc, alumina, calcium silicate, calcium carbonate or a fiber glass.

It is preferred that crystalline silica or fused silica is used as the material for the inorganic filler (II), since they are of high purity and have low thermal expansion coefficients.

The inorganic filler (I) may be used in combination of the inorganic filler (II). It is preferred that 5 to 100 wt % of the inorganic filler (d) is occupied by the filler (I) and 95 to 0 wt % of the inorganic filler (d) is occupied by the filler (II). If the content of the filler (I) is less than 5 wt %, the molding properties of the final resin composition, particularly the fluidity thereof upon melting, are deteriorated, and the effect of reducing the internal stress is lowered.

It is desirous that each of the fillers (I) and (II) has an average particle size of rom 0.5 to 150 microns, preferably from 1 to 60 microns. If the average particle size of the inorganic filler is less than 0.5 micron, the fluidity of the molten resin composition is lowered, and the effect of reducing the internal stress and particularly the effect of improving the resistance to thermal shock are lowered. If the average particle size of the inorganic filler is more than 150 microns, void cavities or wire flowing (wire being cut by flowing of resin) result at the molding step.

It is desirous that each of the fillers (I) and (II) has a specific surface area of from 0.1 to 15 $m^2/g$, preferably from 0.5 to 10 $m^2/g$. If the specific surface area of the inorganic filler is less than 0.1 $m^2/g$, the filling mechanism of the filler is deteriorated so that the molding properties, particularly burr-preventing tendency, of the final resin composition at the molding step are adversely affected. On the contrary, if the specific surface area of the inorganic filler is more than 15 $m^2/g$, the fluidity of the molten resin composition is lowered and the reduction in internal stress, particularly improvement in resistance to thermal shock, does not reach the satisfactory level.

Each of the fillers (I) and (II) should have the following particle size distribution of:

| Particle Size | wt % |
|---|---|
| less than 1 micron | 0 to 5 |
| 1 to less than 10 microns | 1 to 40 |
| 10 to less than 30 microns | 5 to 40 |
| 30 to less than 60 microns | 5 to 60 |
| 60 to less than 90 microns | 2 to 30 |
| 90 to 150 microns | 0 to 10 |

If the particle size distribution of the inorganic filler is out of the range as set forth above, the filling mechanism thereby is changed to result in deterioration of the fluidity of the molten resin composition with the increase of the burrs formed, and the improvement in resistance to thermal shock and the reduction in internal stress are adversely affected.

Examples of additives, optionally added to the resin composition of the invention, include a silane coupling agent such as γ-glycidoxypropyltrimethoxysilane; a curing accelerator such as imidazols and phosphines, the preferred being triphenyl phosphine; a pigment such as carbon black; a releasing agent such as montan wax, carnauba wax or Hoechst wax; and a flame retarding agent such as brominated epoxy resins or antimony trixodide.

The resin composition of the invention may be prepared by blending the ingredients and additives using a mixer, kneading through hot rollers, cooling the kneaded mixture and then pulverizing the cooled mass.

EXAMPLES OF THE INVENTION

The present invention will now be described more specifically with reference to some Examples and Comparative Examples thereof.

In the following Examples and Comparative Examples, "%" and "part" stand for, respectively "wt %" and "part by weight".

EXAMPLES 1 to 10

Each of the organic silicone compounds and organic silicon compounds as set forth in Table 1 and having the structures as shown in the Note of Table 1 was added to 40 parts of a phenol novolak resin and 0.2 part of triphenyl phosphine, the amount of each compound being set forth in Table 1, and reacted in a solvent-containing reaction system or in a solventless reaction system to prepare a phenol-modified silicon-containing compound. In the solvent-containing reaction system, 40 parts of methyl isobutyl ketone was used, and the reaction was continued at 120° C. for 3 hours and then the solvent was distilled off. In the solventless reaction system, the reaction mixture as set forth in Table 1 was reacted at 140° C. for 3 hours. The reaction product was pulverized using a Henschel mixer, and blended with the other ingredients in the mixer, the mixing ratio of each composition being set forth in Table 1 in part by weight. At the blending step, the phenol resin is further admixed to the composition so that each composition formulated in Table 1 was prepared. The admixture was then kneaded through hot rollers, cooled and pulverized. Ten molded materials, according to the present invention, were prepared in accordance with the procedures as described above.

COMPARATIVE EXAMPLES 1 to 7

Generally following the procedures as described in Examples 1 to 10, seven molded materials were prepared by using the organic silicone compounds as set forth in Table 2, and by blending the materials as set forth in Table 2. For the convenience of comparison concerning the preparation process, the preliminary reaction with the phenol resin was omitted in some of the Comparative Examples as shown in Table 2.

The molded materials of the Examples of the invention and the Comparative Examples were appraised by the following methods.

(1) Appraisal of Internal Stress:

In order to learn the internal stress applied on a semiconductor element, piezo-electric resistor elements (each being made of a semiconductor tip of piezo-electric resistor, the resistance of which is changed by the applied internal stress) were set on a 16 pin DIP type IC frame which was encapsulated by each of the resin compositions through the transfer molding step, and the internal stress applied on each element was determined by measuring the change in resistance.

(2) Appraisal of Resistance to Thermal Shock:

A 16 pin lead frame having an island size of 4× 7.5 mm was encapsulated by each of the resin compositions through the transfer molding step. The 16 pin DIP type molded product was subjected to repeated immersion cycles of dipping in a liquid of −196° C. for 30 seconds and dipping in a liquid of +260° C. for 30 seconds. The occurrence of cracking on the surface of the molded product was inspected. 50 specimens for each of the molded articles were checked to learn the percentage occurrence of cracking.

(3) Appraisal of Resistance to Humidity:

Using each of the resin compositions, an element having opposing aluminum wire electrodes was encapsulated through the transfer molding step, and 20 volt bias voltage was applied between the electrodes of the thus encapsulated sample at a temperature of 125° C. and under a steam pressure of 2.5 atm. The fraction defective (in percentage) due to open of the aluminum wire with the lapse of time was calculated by checking 50 specimens for each of the elements encapsulated with each resin composition. The test is referred to as BPCT (Bias Pressure Cooker Test). Similar test was conducted while applying no bias voltage between the electrodes, the test being referred to as PCT (Pressure Cooker Test).

(4) Molding Properties:

The fluidity of each of the molten resin compositions was determined by measuring the spiral flows (see Tables 4 and 5) in accordance with the standard method stipulated by the Epoxide Molding Material Association (SPI EMMI I-66 method). The burr forming property was checked by measuring the length of the longest burr formed by the use of a mold formed with grooves respectively having widths of 2, 5, 10, 20, 30 and 50 microns. The reistance to bleeding was checked by observing the bleeding coming out on the molded article and coming out onto the surface of the mold.

TABLE 1

|  |  |  |  | Examples |  |  |  |  |
|---|---|---|---|---|---|---|---|---|
|  |  |  |  | 1 | 2 | 3 | 4 | 5 |
| Ingredients in the Resin Composition | Cresol Novolak Epoxy Resin |  |  | 78.4 | 68.5 | 78.7 | 70.0 | 70.5 |
|  | Brominated Epoxy Resin |  |  | 13.9 | 12.1 | 13.9 | 12.3 | 12.5 |
|  | Phenol Novolak Resin |  |  | 6.2 | 0.4 | 6.4 | 1.2 | 1.5 |
|  | Triphenyl Phosphine |  |  | 1.0 | 1.0 | 1.0 | 1.0 | 1.0 |
|  | Carnauba Wax |  |  | 2.5 | 2.5 | 2.5 | 2.5 | 2.5 |
|  | Carbon Black |  |  | 1.0 | 1.0 | 1.0 | 1.0 | 1.0 |
|  | Antimony Trioxide |  |  | 6.0 | 6.0 | 6.0 | 6.0 | 6.0 |
|  | γ-Glycidoxypropyltrimethoxysilane |  |  | 6.0 | 6.0 | 6.0 | 6.0 | 6.0 |
|  | Fused Silica |  |  | 390 | 390 | 390 | 390 | 390 |
|  | Phenol-modified Silicon-containing Compound | Phenol Novolak Resin |  | 40 | 40 | 40 | 40 | 40 |
|  |  | Triphenyl Phosphine |  | 0.2 | 0.2 | 0.2 | 0.2 | 0.2 |
|  |  | Organic Silicone Compound *See Note | (1) | 10 | 25 | — | — | — |
|  |  |  | (2) | — | — | 10 | 25 | — |
|  |  |  | (3) | — | — | — | — | 25 |
|  |  |  | (4) | — | — | — | — | — |
|  |  |  | (5) | — | — | — | — | — |
|  |  |  | (6) | — | — | — | — | — |
|  |  | Mercaptopropyltrimethoxysilane |  | 1.5 | 4.0 | — | 1.5 | — |
|  |  | Ureidopropyltriethoxysilane |  | — | — | 1.0 | — | — |
|  |  | Aminopropyltrimethoxysilane |  | — | — | — | — | 0.5 |
| Process Condition Properties | Pre-reaction of Organic Silicone Compound, Organic Silicon Compound and Phenol Resin | Solvent System |  | O | O | X | X | X |
|  |  | Solventless System |  | X | X | O | O | O |
|  | Molding Properties (Resistance to Bleeding) |  |  | good | good | good | good | good |
|  | Internal Stress (Kg/mm$^2$) |  |  | 16.0 | 12.2 | 16.8 | 12.0 | 13.4 |
|  | Resistance to Thermal Shock (Occurrence of Cracking (%)) | 80 cycles |  | 0 | 0 | 0 | 0 | 0 |
|  |  | 100 cycles |  | 0 | 0 | 0 | 0 | 0 |
|  |  | 120 cycles |  | 0 | 0 | 0 | 0 | 0 |
|  | Fraction Defective Due to BPCT Open (%) | 80 hrs. |  | 0 | 0 | 0 | 0 | 0 |
|  |  | 120 hrs. |  | 0 | 0 | 0 | 0 | 0 |
|  | Fraction Defective Due to PCT Open (%) | 800 hrs. |  | 0 | 0 | 0 | 0 | 0 |
|  |  | 1200 hrs. |  | 0 | 0 | 0 | 0 | 0 |

|  |  |  |  | Examples |  |  |  |  |
|---|---|---|---|---|---|---|---|---|
|  |  |  |  | 6 | 7 | 8 | 9 | 10 |
| Ingredients in the Resin Composition | Cresol Novolak Epoxy Resin |  |  | 70.2 | 70.0 | 69.1 | 68.5 | 68.5 |
|  | Brominated Epoxy Resin |  |  | 12.4 | 12.3 | 12.2 | 12.1 | 12.1 |
|  | Phenol Novolak Resin |  |  | 1.4 | 1.2 | 0.7 | 0.4 | 0.4 |
|  | Triphenyl Phosphine |  |  | 1.0 | 1.0 | 1.0 | 1.0 | 1.0 |
|  | Carnauba Wax |  |  | 2.5 | 2.5 | 2.5 | 2.5 | 2.5 |
|  | Carbon Black |  |  | 1.0 | 1.0 | 1.0 | 1.0 | 1.0 |
|  | Antimony Trioxide |  |  | 6.0 | 6.0 | 6.0 | 6.0 | 6.0 |
|  | γ-Glycidoxypropyltrimethoxysilane |  |  | 6.0 | 6.0 | 6.0 | 6.0 | 6.0 |
|  | Fused Silica |  |  | 390 | 390 | 390 | 390 | 390 |
|  | Phenol-modified Silicon-containing Compound | Phenol Novolak Resin |  | 40 | 40 | 40 | 40 | 40 |
|  |  | Triphenyl Phosphine |  | 0.2 | 0.2 | 0.2 | 0.2 | 0.2 |
|  |  | Organic Silicone Compound *See Note | (1) | — | — | 15 | — | — |
|  |  |  | (2) | 10 | 5 | — | — | — |
|  |  |  | (3) | — | — | — | — | — |
|  |  |  | (4) | 15 | 20 | — | 25 | — |
|  |  |  | (5) | — | — | 10 | — | 25 |
|  |  |  | (6) | — | — | — | — | — |
|  |  | Mercaptopropyltrimethoxysilane |  | 1.0 | — | 3.0 | 1.5 | — |
|  |  | Ureidopropyltriethoxysilane |  | — | 1.5 | — | — | 1.5 |
|  |  | Aminopropyltrimethoxysilane |  | — | — | — | — | — |
| Process Condition Properties | Pre-reaction of Organic Silicone Compound, Organic Silicon Compound and Phenol Resin | Solvent System |  | X | X | O | X | O |
|  |  | Solventless System |  | O | O | X | O | X |
|  | Molding Properties (Resistance to Bleeding) |  |  | good | good | good | good | good |
|  | Internal Stress (Kg/mm$^2$) |  |  | 12.7 | 15.1 | 12.5 | 13.1 | 13.9 |
|  | Resistance to Thermal Shock | 80 cycles |  | 0 | 0 | 0 | 0 | 0 |

TABLE 1-continued

|  |  |  |  |  |  |  |
|---|---|---|---|---|---|---|
| (Occurrence of Cracking (%)) | 100 cycles | 0 | 0 | 0 | 0 | 0 |
|  | 120 cycles | 0 | 0 | 0 | 0 | 0 |
| Fraction Defective Due to | 80 hrs. | 0 | 0 | 0 | 0 | 0 |
| BPCT Open (%) | 120 hrs. | 0 | 0 | 0 | 0 | 0 |
| Fraction Defective Due to | 800 hrs. | 0 | 0 | 0 | 0 | 0 |
| PCT Open (%) | 1200 hrs. | 0 | 0 | 0 | 0 | 0 |

TABLE 2

|  |  |  | Comparative Examples | | | | | | |
|---|---|---|---|---|---|---|---|---|---|
|  |  |  | 1 | 2 | 3 | 4 | 5 | 6 | 7 |
| Ingredients in the Resin Composition | Cresol Novolak Epoxy Resin | | 70.8 | 70.8 | 79.3 | 70.8 | 70.8 | 70.8 | 85 |
| | Brominated Epoxy Resin | | 12.5 | 12.5 | 14.0 | 12.5 | 12.5 | 12.5 | 15 |
| | Phenol Novolak Resin | | 1.7 | 41.7 | 6.7 | 1.7 | 46.7 | 1.7 | 50 |
| | Triphenyl Phosphine | | 1.0 | 1.0 | 1.0 | 1.0 | 1.0 | 1.0 | 1.0 |
| | Carnauba Wax | | 2.5 | 2.5 | 2.5 | 2.5 | 2.5 | 2.5 | 2.5 |
| | Carbon Black | | 1.0 | 1.0 | 1.0 | 1.0 | 1.0 | 1.0 | 1.0 |
| | Antimony Trioxide | | 6.0 | 6.0 | 6.0 | 6.0 | 6.0 | 6.0 | 6.0 |
| | γ-Glycidoxypropyltrimethoxysilane | | 6.0 | 6.0 | 6.0 | 6.0 | 6.0 | 6.0 | 6.0 |
| | Fused Silica | | 390 | 390 | 390 | 390 | 390 | 390 | 390 |
| | Phenol-modified Silicon-containing Compound | Phenol Novolak Resin | 40 | — | 40 | 40 | — | 40 | — |
| | | Triphenyl Phosphine | 0.2 | — | 0.2 | 0.2 | — | 0.2 | — |
| | | Organic Silicone Compound (1) *See Note | 25 | 25 | — | — | — | — | — |
| | | Organic Silicone Compound (2) | — | — | — | — | — | — | — |
| | | Organic Silicone Compound (3) | — | — | — | — | — | — | — |
| | | Organic Silicone Compound (4) | — | — | 10 | 25 | — | — | — |
| | | Organic Silicone Compound (5) | — | — | — | — | 25 | — | — |
| | | Organic Silicone Compound (6) | — | — | — | — | — | 25 | — |
| | | Mercaptopropyltrimethoxysilane | — | — | — | — | — | — | — |
| | | Ureidopropyltriethoxysilane | — | — | — | — | — | — | — |
| | | Aminopropyltrimethoxysilane | — | — | — | — | — | — | — |
| Process Condition | Pre-reaction of Organic Silicone Compound, Organic Silicon Compound and Phenol Resin | Solvent System | O | X | O | X | X | X | X |
| | | Solventless System | X | X | X | O | X | O | X |
| Properties | Molding Properties (Resistance to Bleeding) | | poor | poor | poor | poor | poor | poor | poor |
| | Internal Stress (Kg/mm$^2$) | | 14.1 | 27.9 | 32.4 | 29.6 | 33.1 | 33.0 | 36.0 |
| | Resistance to Thermal Shock (Occurrence of Cracking (%)) | 80 cycles | 0 | 64 | 100 | 88 | 100 | 100 | 100 |
| | | 100 cycles | 0 | 100 | — | 100 | — | — | — |
| | | 120 cycles | 6 | — | — | — | — | — | — |
| | Fraction Defective Due to BPCT Open (%) | 80 hrs. | 0 | 8 | 0 | 0 | 6 | 14 | 92 |
| | | 120 hrs. | 4 | 22 | 12 | 10 | 30 | 32 | 100 |
| | Fraction Defective Due to | 800 hrs. | 0 | 12 | 0 | 0 | 8 | 18 | 48 |

TABLE 2-continued

|  |  | Comparative Examples | | | | | | |
|---|---|---|---|---|---|---|---|---|
|  |  | 1 | 2 | 3 | 4 | 5 | 6 | 7 |
| PCT Open (%) | 1200 hrs. | 8 | 30 | 12 | 8 | 28 | 38 | 100 |

(Note)

(1) $CH_3-Si(CH_3)_2-O-[Si(CH_3)_2-O]_l-[Si(CH_3)(-(CH_2)_3OCH_2-CH(-O-)CH_2)-O]_m-[Si(CH_3)(-(CH_2)_3-(OCH_2-CH_2)_{25}OH)-O]_n-Si(CH_3)_2-C(CH_3)_3$  $\{l=82, m=6, n=2\}$ (2) $CH_3-Si(CH_3)_2-O-[Si(CH_3)_2-O]_l-[Si(CH_3)(-(CH_2)_3OCH_2-CH(-O-)CH_2)-O]_m-[Si(CH_3)(-(CH_2)_3-(OCH_2-CH_2)_{35}-(OCH_2-CH(CH_3))_{35}OH)-O]_n-Si(CH_3)_3$  $\{l=160, m=7, n=3\}$ (3) $HO-Si(CH_3)_2-O-[Si(CH_3)_2-O]_l-[Si(CH_3)(-CH_2-CH(-O-)CH_2)-O]_m-[Si(CH_3)(-(OCH_2-CH(CH_3))_{10}OH)-O]_n-Si(CH_3)_2-OH$  $\{l=1200, m=10, n=5\}$ (4) $CH_3-Si(CH_3)_2-O-[Si(CH_3)_2-O]_o-[Si(CH_3)(-(CH_2)_3-O-CH_2-CH(-O-)CH_2)-O]_p-Si(CH_3)_3$  $\{o=4, p=120\}$ (5) $CH_3-Si(CH_3)_2-O-[Si(CH_3)_2-O]_o-[Si(CH_3)(-CH_2-CH(-O-)CH_2)-O]_p-Si(CH_3)_3$  $\{o=10, p=1000\}$ (6) $CH_3-Si(CH_3)_2-O-[Si(CH_3)_2-O]_q-Si(CH_3)_3$  $q=200$

EXAMPLES 11 to 21

The resin compositions of the invention were prepared by using the inorganic fillers as shown in Table 3 through a process generally similar to that described in Examples 1 to 10, and the properties of the resin compositions were appraised similarly as in Examples 1 to 10. The results are shown in Table 4.

COMPARATIVE EXAMPLES 8 to 12

The inorganic fillers as set forth in Table 3 were used to prepare resin compositions, similarly as in the preceding Examples and Comparative Examples, and the resin compositions were appraised through the similar test methods. The results are shown in Table 5.

TABLE 3

| Inorganic Filler | Configuration I (parts) | Configuration II (Parts) | less than 1 μm (%) | 1~ less than 10 μm (%) | 10~ less than 30 μm (%) | 30~ less than 60 μm (%) | 60~ less than 90 μm (%) | 90~ 150 μm (%) |
|---|---|---|---|---|---|---|---|---|
| A | 100 | 0 | 0.1 | 15 | 30 | 50 | 4 | 0.9 |
| B | 10 | 90 | 0.1 | 15 | 30 | 50 | 4 | 0.9 |
| C | 30 | 70 | 0.5 | 19 | 32 | 46 | 2 | 0.5 |
| D | 50 | 50 | 0.2 | 16.8 | 25 | 51 | 6 | 1 |
| E | 70 | 30 | 0.8 | 19 | 30 | 42 | 7 | 1.2 |
| F | 80 | 20 | 0.5 | 25 | 35 | 30.5 | 6 | 3 |
| G | 90 | 10 | 2 | 38 | 28 | 28 | 3 | 1 |

TABLE 4

| | | | | | Examples | | | | | |
|---|---|---|---|---|---|---|---|---|---|---|
| | | | | | 11 | 12 | 13 | 14 | 15 | 16 |
| Ingredients in the Resin Composition | Cresol Novolak Epoxy Resin | | | | 78.4 | 68.5 | 70.0 | 70.0 | 78.7 | 70.5 |
| | Brominated Epoxy Resin | | | | 13.9 | 12.1 | 12.3 | 12.3 | 13.9 | 12.5 |
| | Phenol Novolak Resin | | | | 6.2 | 0.4 | 1.2 | 1.2 | 6.4 | 1.5 |
| | Triphenyl Phosphine | | | | 1.0 | 1.0 | 1.0 | 1.0 | 1.0 | 1.0 |
| | Carnauba Wax | | | | 2.5 | 2.5 | 2.5 | 2.5 | 2.5 | 2.5 |
| | Carbon Black | | | | 1.0 | 1.0 | 1.0 | 1.0 | 1.0 | 1.0 |
| | Antimony trioxide | | | | 6.0 | 6.0 | 6.0 | 6.0 | 6.0 | 6.0 |
| | γ-Glycidoxypropyltrimethoxysilane | | | | 6.0 | 6.0 | 8.0 | 8.0 | 8.0 | 8.0 |
| | Phenol-modified Silicon-containing Compound | Phenol Novolak Resin | | | 40 | 40 | 40 | 40 | 40 | 40 |
| | | Triphenyl Phosphine | | | 0.2 | 0.2 | 0.2 | 0.2 | 0.2 | 0.2 |
| | | Organic Silicone Compound *See Note | (1) | | 10 | 25 | — | — | — | — |
| | | | (2) | | — | — | 25 | 25 | — | 10 |
| | | | (3) | | — | — | — | — | — | — |
| | | | (4) | | — | — | — | — | — | 15 |
| | | | (5) | | — | — | — | — | 10 | — |
| | | | (6) | | — | — | — | — | — | — |
| | | Mercaptopropyltrimethoxysilane | | | 1.5 | 4.0 | 1.5 | 1.5 | — | — |
| | | Ureidopropyltriethoxysilane | | | — | — | — | — | 1.0 | — |
| | | Aminopropyltrimethoxysilane | | | — | — | — | — | — | 0.5 |
| | Inorganic Filler | A | | | — | — | 500 | — | — | — |
| | | B | | | — | — | — | 500 | — | — |
| | | C | | | 390 | — | — | — | — | — |
| | | D | | | — | 390 | — | — | — | — |
| | | E | | | — | — | — | — | 500 | 500 |
| | | F | | | — | — | — | — | — | — |
| | | G | | | — | — | — | — | — | — |
| Process Condition | Pre-reaction of Organic Silicone Compound, Organic Silicon Compound and Phenol Resin | | Solvent System | | O | O | X | X | X | X |
| | | | Solventless System | | X | X | O | O | O | O |
| Properties | Molding Properties | Resistance to Bleeding | | | good | good | good | good | good | good |
| | | Spiral Flow (cm) | | | 110 | 105 | 95 | 96 | 93 | 98 |
| | | Burr (mm) | | | 3.0 | 3.2 | 2.0 | 1.8 | 3.0 | 1.5 |
| | Internal Stress (Kg/mm$^2$) | | | | 12.8 | 10.8 | 9.8 | 10.2 | 13.0 | 10.8 |
| | Resistance to Thermal Shock (Occurrence of Cracking (%)) | 120 cycles | | | 0 | 0 | 0 | 0 | 0 | 0 |
| | | 150 cycles | | | 0 | 0 | 0 | 0 | 0 | 0 |
| | | 180 cycles | | | 0 | 0 | 0 | 0 | 0 | 0 |
| | Fraction Defective Due to BPCT Open (%) | 120 hrs. | | | 0 | 0 | 0 | 0 | 0 | 0 |
| | | 160 hrs. | | | 0 | 0 | 0 | 0 | 0 | 0 |
| | Fraction Defective Due to PCT Open (%) | 1200 hrs. | | | 0 | 0 | 0 | 0 | 0 | 0 |
| | | 1600 hrs. | | | 0 | 0 | 0 | 0 | 0 | 0 |

| | | | | | Examples | | | | |
|---|---|---|---|---|---|---|---|---|---|
| | | | | | 17 | 18 | 19 | 20 | 21 |
| Ingredients in the Resin Composition | Cresol Novolak Epoxy Resin | | | | 69.1 | 70.0 | 70.0 | 70.0 | 78.7 |
| | Brominated Epoxy Resin | | | | 12.2 | 12.3 | 12.3 | 12.3 | 13.9 |
| | Phenol Novolak Resin | | | | 0.7 | 1.2 | 1.2 | 1.2 | 6.4 |
| | Triphenyl Phosphine | | | | 1.0 | 1.0 | 1.0 | 1.0 | 1.0 |
| | Carnauba Wax | | | | 2.5 | 2.5 | 2.5 | 2.5 | 2.5 |
| | Carbon Black | | | | 1.0 | 1.0 | 1.0 | 1.0 | 1.0 |
| | Antimony trioxide | | | | 6.0 | 6.0 | 6.0 | 6.0 | 6.0 |
| | γ-Glycidoxypropyltrimethoxysilane | | | | 8.0 | 10.0 | 10.0 | 8.0 | 8.0 |
| | Phenol-modified Silicon-containing Compound | Phenol Novolak Resin | | | 40 | 40 | 40 | 40 | 40 |
| | | Triphenyl Phosphine | | | 0.2 | 0.2 | 0.2 | 0.2 | 0.2 |
| | | Organic Silicone Compound *See Note | (1) | | 15 | — | — | — | — |
| | | | (2) | | — | 5 | 25 | — | — |
| | | | (3) | | — | — | — | — | — |
| | | | (4) | | — | 20 | — | — | 10 |
| | | | (5) | | 10 | — | — | 25 | — |
| | | | (6) | | — | — | — | — | — |
| | | Mercaptopropyltrimethoxysilane | | | 3.0 | 1.5 | 1.5 | 1.5 | — |
| | | Ureidopropyltriethoxysilane | | | — | — | — | — | 1.0 |
| | | Aminopropyltrimethoxysilane | | | — | — | — | — | — |
| | Inorganic Filler | A | | | — | — | 667 | 500 | — |
| | | B | | | — | — | — | — | — |
| | | C | | | — | — | — | — | — |
| | | D | | | — | — | — | — | — |
| | | E | | | — | — | — | — | 500 |
| | | F | | | — | 667 | — | — | — |
| | | G | | | 500 | — | — | — | — |
| Process Condition | Pre-reaction of Organic Silicone Compound, Organic Silicon Compound and Phenol Resin | | Solvent System | | X | O | O | X | O |
| | | | Solventless System | | O | X | X | O | X |
| Properties | Molding Properties | Resistance to Bleeding | | | good | good | good | good | good |
| | | Spiral Flow (cm) | | | 90 | 83 | 80 | 90 | 91 |
| | | Burr (mm) | | | 2.0 | 3.2 | 2.0 | 1.6 | 2.8 |
| | Internal Stress (Kg/mm$^2$) | | | | 10.5 | 11.0 | 9.9 | 10.3 | 13.2 |
| | Resistance to Thermal Shock (Occurrence of Cracking (%)) | 120 cycles | | | 0 | 0 | 0 | 0 | 0 |
| | | 150 cycles | | | 0 | 0 | 0 | 0 | 0 |
| | | 180 cycles | | | 0 | 0 | 0 | 0 | 0 |
| | Fraction Defective Due to BPCT Open (%) | 120 hrs. | | | 0 | 0 | 0 | 0 | 0 |
| | | 160 hrs. | | | 0 | 0 | 0 | 0 | 0 |

TABLE 4-continued

|  |  |  |  |  |  |  |
|---|---|---|---|---|---|---|
| Fraction Defective Due to PCT Open (%) | 1200 hrs. | 0 | 0 | 0 | 0 | 0 |
|  | 1600 hrs. | 0 | 0 | 0 | 0 | 0 |

TABLE 5

|  |  |  |  | Comparative Examples | | | | |
|---|---|---|---|---|---|---|---|---|
|  |  |  |  | 8 | 9 | 10 | 11 | 12 |
| Ingredients in the Resin Composition | Cresol Novolak Epoxy Resin | | | 70.8 | 70.8 | 79.3 | 70.8 | 70.8 |
|  | Brominated Epoxy Resin | | | 12.5 | 12.5 | 14.0 | 12.5 | 12.5 |
|  | Phenol Novolak Resin | | | 1.7 | 41.7 | 6.7 | 1.7 | 1.7 |
|  | Triphenyl Phosphine | | | 1.0 | 1.0 | 1.0 | 1.0 | 1.0 |
|  | Carnauba Wax | | | 2.5 | 2.5 | 2.5 | 2.5 | 2.5 |
|  | Carbon Black | | | 1.0 | 1.0 | 1.0 | 1.0 | 1.0 |
|  | Antimony Trioxide | | | 6.0 | 6.0 | 6.0 | 6.0 | 6.0 |
|  | γ-Glycidoxypropyltrimethoxysilane | | | 6.0 | 6.0 | 8.0 | 10.0 | 6.0 |
|  | Phenol-modified Silicon-containing Compound | Phenol Novolak Resin | | 40 | — | 40 | 40 | 40 |
|  |  | Triphenyl Phosphine | | 0.2 | — | 0.2 | 0.2 | 0.2 |
|  |  | Organic Silicone Compound *See Note | (1) | 25 | — | — | — | — |
|  |  |  | (2) | — | 25 | — | — | — |
|  |  |  | (3) | — | — | — | — | — |
|  |  |  | (4) | — | — | 10 | — | — |
|  |  |  | (5) | — | — | — | 25 | — |
|  |  |  | (6) | — | — | — | — | 25 |
|  | Mercaptopropyltrimethoxysilane | | | — | — | — | — | — |
|  | Ureidopropyltriethoxysilane | | | — | — | — | — | — |
|  | Aminopropyltrimethoxysilane | | | — | — | — | — | — |
|  | Inorganic Filler | A | | 390 | — | — | — | — |
|  |  | C | | — | 390 | — | — | 390 |
|  |  | D | | — | — | 500 | — | — |
|  |  | E | | — | — | — | 667 | — |
| Process Condition Properties | Pre-reaction of Organic Silicone Compound, Organic Silicon Compound and Phenol Resin | Solvent System | | O | O | X | X | O |
|  |  | Solventless System | | X | X | O | O | X |
|  | Molding Properties | Resistance to Bleeding | | poor | poor | poor | poor | poor |
|  |  | Spiral Flow (cm) | | 110 | 94 | 96 | 70 | 105 |
|  |  | Burr (mm) | | 3.0 | 5.8 | 2.8 | 3.0 | 4.0 |
|  | Internal Stress (Kg/mm²) | | | 13.2 | 25.0 | 28.2 | 26.0 | 31.0 |
|  | Resistance to Thermal Shock (Occurrence of Cracking (%)) | 120 cycles | | 2 | 90 | 4 | 0 | 100 |
|  |  | 150 cycles | | 10 | — | 18 | 8 | — |
|  |  | 180 cycles | | 34 | — | 52 | 30 | — |
|  | Fraction Defective Due to BPCT Open (%) | 120 hrs. | | 4 | 18 | 10 | 2 | 30 |
|  |  | 160 hrs. | | 10 | 32 | 28 | 8 | 40 |
|  | Fraction Defective Due to PCT Open (%) | 1200 hrs. | | 4 | 20 | 10 | 2 | 32 |
|  |  | 1600 hrs. | | 12 | 40 | 34 | 10 | 54 |

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. An epoxy resin composition for encapsulating a semiconductor comprising:
   (a) an epoxy resin;
   (b) a phenol resin;
   (c) a phenol-modified silicon-containing compound obtained by reacting an organic silicone compound selected from the group consisting of a first organic silicone compound having an epoxy equivalent of from 500 to 20,000 and a molecular weight of from 2,000 to 200,000 represented by the following formulae (1-a) and (1-b), a second organic silicone compond having an epoxy equivalent of from 500 to 20,000 annd a molecular weight of from 2,000 to 200,000 represented by the following formula (2), and mixtures of said first and second organic silicone compounds, with from 0.2 to 10 molar equivalents of an organic silicon compound represented by the following formula (3) per molar equivalent of the epoxy group of the compound of the formulae (1-a), (1-b) and (2) and with a phenol resin;

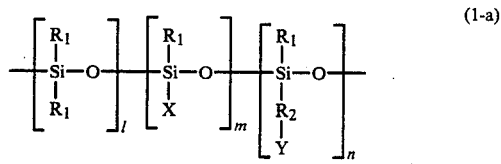
(1-a)

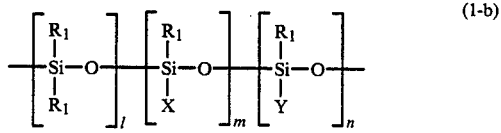
(1-b)

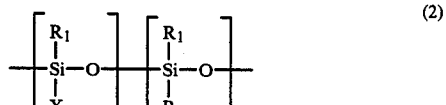
(2)

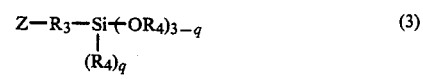
(3)

wherein in the formulae (1-a), (1-b) and (2) $R_1$ stands for a hydrogen atom, a methyl group, an ethyl group or a phenyl group, R2 for an alkylene group having 1 to 5 carbon atoms, X for an organic group containing an epoxy group, Y is a polyoxyalkylene group having a polymerization degree of from 5 to 500 and stands for a polyoxyethylene group, a polyoxypropylene group and a copolymer group thereof, and l, m, n, o and p each represents an integer; and wherein the formula (3) Z is a functional group reactable with an epoxy group and stands for a mercapto group, an amino group or a ureido group, $R_3$ for an alkylene group having 2 to 5 carbon atoms, $R_4$ for a methyl group or an ethyl group and q is 0, 1 or 2; and (d) an inorganic filler, wherein 5 to 50 parts by weight of (c) is present for each 100 parts by weight of (a).

2. The epoxy resin composition according to claim 1, wherein said epoxy resin (a) has at least two epoxy bonds in one molecule.

3. The epoxsy resin composition according to claim 2, wherein said epoxy resin (a) is selected from the group consisting of bisphenol-A epoxy resins, phenol novolak epoxy resins and cresol novolak epoxy resins.

4. The epoxy resin composition according to claim 1, wherein said phenol resin (b) is selected from the group consistint of phenol novolak resins and cresol novolak resins.

5. The epoxy resin composition according to claim 1, wherein each of said first asnd seocnd organic silicone compounds has a terminal group selected from the group consisting of —OR, —R, —OSi(R)$_3$ and —Si(R)$_3$ (wherein R is a hydrogen atom, an alkyl group, an aryl group, an epoxy-containing organic group or a vinyl-containing organic group).

6. The epoxy resin composition according to claim 1, wherein said phenol resin used in the preparation of said phenol-modified silicon-containing compound (c) is selected from the group consisting of phenol novolak resins and cresol novolak resins.

7. The epoxy resin composition according to claim 1, wherein 50 wt % or more of the epoxy groups contained in said first and/or second organic silicone compounds are reacted with said phenol resin and said organic silicon compound.

8. The epoxy resin composition according to claim 1, wherein said inorganic filler (d) is selected from the group consisting of crystalline silica, fused silica, calcium silicate, alumina, calcium carbonate, talc, barium sulfate, fiber glass and mixtures thereof.

9. The epoxy resin composition according to claim 1, wherein 100 parts by weight of the resinous ingredients of said composition are mixed with 150 to 900 parts by weight of said inorganic filler (d).

10. The epoxy resin composition according to claim 1, wherein said inorganic filler (d) comprises 5 to 100 wt % of a first filler (I) having substantially no fractured faces, and 95 to 0 wt % of a second filler (II) having substantially fractured faces.

11. The epoxy resin composition according to claim 10, wherein said first filler (I) has a shape selected from the group consisting of spherical, oval, gourd-like, tubular and bar-like shapes.

12. The epoxy resin composition according to claim 10, wherein each of said first and second fillers (I) and (II) has an average particle size of from 0.5 to 150 microns.

13. The epoxy resin composition according to claim 10, wherein each of said first and second fillers (I) and (II) has a specific surface area of from 0.1 to 15 m$^2$/g.

14. The epoxy resin composition according to claim 10, wherein each of said first and second fillers (I) and (II) has a particle size distribution of:

| Particle Size | wt % |
| --- | --- |
| less than 1 micron | 0 to 5 |
| 1 to less than 10 microns | 1 to 40 |
| 10 to less than 30 microns | 5 to 40 |
| 30 to less than 60 microns | 5 to 60 |
| 60 to less than 90 microns | 2 to 30 |
| 90 to 150 microns | 0 to 10 |

15. The epoxy resin composition according to claim 1, further comprising an additive selected from the group consisting of a silane coupling agent, a curing accelerator, a releasing agent, a flame retarding agent and a mixture thereof.

* * * * *